United States Patent [19]

Eppley et al.

[11] Patent Number: 4,800,141
[45] Date of Patent: Jan. 24, 1989

[54] RESERVE ACTIVATED ELECTROCHEMICAL CELL

[75] Inventors: William J. Eppley, Skippack, Pa.; Warren E. Hawkins, Brooklyn Park, Minn.

[73] Assignee: Honeywell Inc., Minneapolis, Minn.

[21] Appl. No.: 122,105

[22] Filed: Nov. 17, 1987

[51] Int. Cl.⁴ .............................................. H01M 6/30
[52] U.S. Cl. .................................................... 429/116
[58] Field of Search ....................... 429/114, 116, 110

[56] References Cited

U.S. PATENT DOCUMENTS

| | | | |
|---|---|---|---|
| 4,048,396 | 9/1977 | Hollander, Jr. | 429/116 |
| 4,612,264 | 9/1986 | Fairwood et al. | 429/114 |
| 4,699,854 | 10/1987 | Snyder | 429/114 |

Primary Examiner—Anthony Skapars
Attorney, Agent, or Firm—Mitchell J. Halista; Charles G. Mersereau; Albin Medved

[57] ABSTRACT

A reserve activated electrochemical cell uses a frangible glass ampule for storing an electrolyte. The ampule is located within a first cylindrical cup-shaped metal housing containing a pair of cell electrodes. One of the electrodes is formed by an electrically conductive ring electrically isolated from the wall of the housing while the other electrode is constituted by an electrically active coating on an inner surface of the wall of the housing. The first cylindrical housing is arranged to form a contiguous extension of a second cylindrical metal housing and is attached by an electrically conductive weld bead located along a peripheral edge of an open end of the cup to the second housing to form a fluid-tight seal therewith while facilitating an electrical connection to the first one of the electrodes. An electrical connection to the other one of the electrodes is provided by a wire extending through a fluid-tight seal in a wall of the second housing and connected to the other electrode. The second cylindrical housing is used to form a container for an electronic apparatus to be powered by the electrochemical cell.

6 Claims, 1 Drawing Sheet

FIG. 1
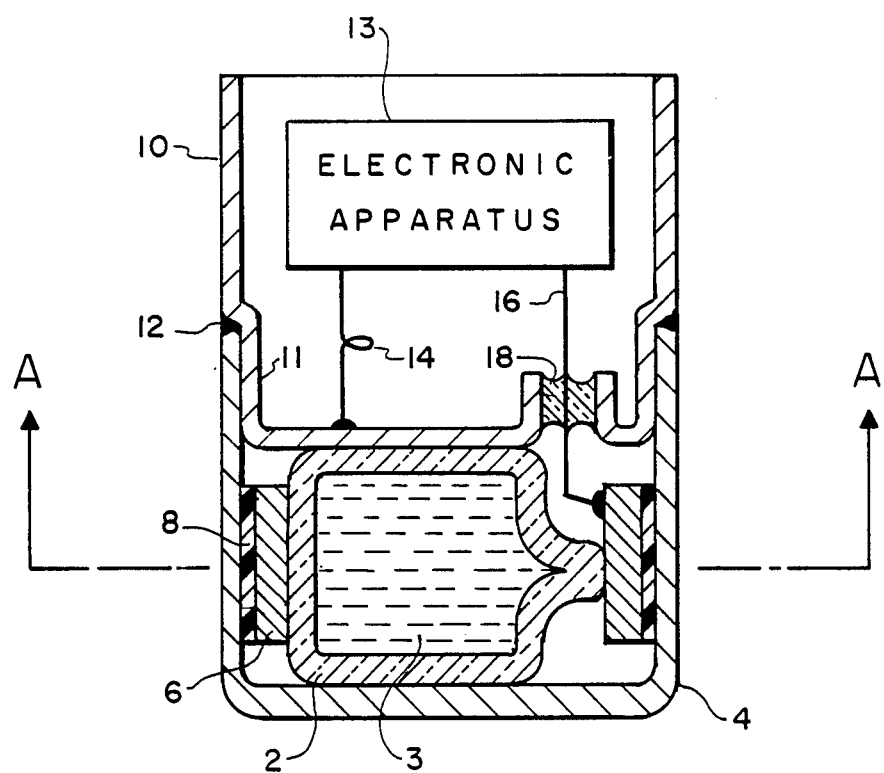
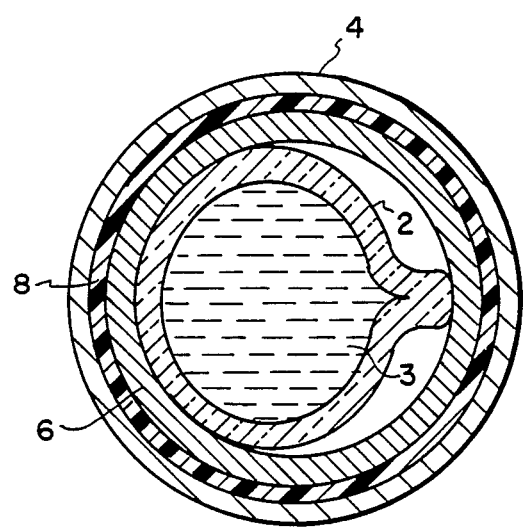
FIG. 2

RESERVE ACTIVATED ELECTROCHEMICAL CELL

The Government has rights in this invention pursuant to Contact No. FO8635-85-C-0151, awarded by the Department of the Air Force.

BACKGROUND OF THE INVENTION

1. Field of the Invention

The present invention relates to reserve activated electric current producing electrochemical cells. More specifically, the present invention is directed to an electrochemical cell containing an electrolyte container for selectively releasing a stored electrolyte to activate the electrochemical cell.

SUMMARY OF THE INVENTION

An object of the present invention is to provide an improved miniaturized reserve activated electric current producing electrochemical cell.

In accomplishing this and other objects, there has been provided, in accordance with the present invention a reserve activated electrochemical cell including a frangible electrolyte storage means, a first means for housing the electrolyte storage means, a pair of cell electrodes located within the first means outside of said storage means and a second means forming a contiguous extension of the first means and attached with a fluid-tight seal thereto while providing separate electrical connections to the first and second electrodes.

BRIEF DESCRIPTION OF THE DRAWINGS

A better understanding of the present invention may be had when the following detailed description is read in connection with the accompanying drawings, in which:

FIG. 1 is a cross-sectional illustration of an example of a reserve activated electrochemical cell embodying the present invention in an inactive electrolyte storing stage and FIG. 2 is a cross-sectional illustration of the electrochemical cell shown in FIG. 1 taken along lines A—A.

DESCRIPTION OF THE PREFERRED EMBODIMENT

Referring to FIG. 1 in more detail, there is shown an electrochemical cell in an inactive or electrolyte storing state including an electrolyte storage ampule 2 containing an electrolyte 3. The ampule 2 may be made of a suitable material, e.g., glass, with the wall of the ampule having a thickness effective to produce a frangible layer which is subject to rupture or collapse upon the imposition of a high acceleration force thereon. The ampule 2 is located within an outer housing 4 arranged as an open cup-shaped cylindrical container. A first electrode of the electrochemical cell or battery is preferably formed by a metal plating, e.g., lithium, on the wall of the housing 4 which is preferably made of metal, e.g., stainless steel, and a second electrode is located within the housing 4 in the form of an electrically conductive ring electrode 6. The second ring electrode 6 is mounted on an insulating band 8 which is attached to an inner surface of the housing 4 and provides electrical isolation of the second electrode 6 from the housing 4.

The cup-shaped housing 4 is arranged to be coextensive and contiguous with a second cylindrical cup-shaped housing 10 and is arranged to nest therewith on an indented surface 11 on the closed end of the second housing 10, i.e., the closed end 11 of the second housing 10 fits within the open end of the first housing 4. The first housing 4 is attached to the second housing 10, which is made of a suitable material, e.g., stainless steel, by a weld bead 12 located along the peripheral edge of the open end of the first housing 4 to form a fluid-tight seal with the indented end 11 of the second housing 10 while facilitating an electrical connection between the housing 4,10.

An electronic apparatus 13 is located within the second housing 10 whereby the electrochemical cell would provide a source of electrical power for the electronic apparatus 12 with the electronic apparatus 12 being used in a fuse within an ammunition round or shell to produce so-called "intelligent ammunition38 . In this configuration, it is desired that the power source, i.e., the reserve actuated electrochemical cell or battery, remain dormant until the round is fired. The high acceleration produced by firing the round produces a force on the thin amplue wall in accordance with $F = mA$. This force is effective to collapse or rupture the ampule and to release or deliver the electrolyte into the interior of the first housing 4. The spinning of the housing 4 after a firing of the shell distributes the electrolyte to the sides of the interior of the housing 4 where it contacts the coating on the inner surface of the housing 4 forming the first electrode of the battery and the second battery electrode provided by the ring 6.

In order to provide electrical connections between the electrochemical cell and the electronic apparatus 13, a first electrical connection or wire 14 is provided between the electrical apparatus 13 and the wall of the second housing 10 which, in turn, is electrically connected to the wall of the first housing 4 by means of the weld bead 12. A second electrical connection or wire 16 is provided through a fluid-tight glass seal 18 located in the wall of the second housing 10 whereby the wire 16 is directed through the wall of the first housing 10 while being electrically isolated therefrom and is connected to the ring electrode 6 within the first housing 4 while maintaining a fluid-tight connection of the first housing 4 to the second housing 10.

Thus, after firing of the round all the active electrode surfaces within the first housing 4 are wetted by the electrolyte released from the collapsed ampule 2, and the electrochemical cell is activated to power the associated electronic apparatus 13. The glass-to-metal seal 18 for the wire 16 is arranged to have a thickness substantially greater than the wall of the ampule 2 to resist rupture during the acceleration of the shell to retain the electrolyte within the first housing 4. The integral and nested construction of the first and second housing 4,10 provides structural support and facilitates the electrical connections for the electrochemical cell whereby the housing 4 for the electrochemical cell can be miniaturized to provide a small overall packaging and lower material cost through the minimization of parts and lower assembly cost.

Accordingly, it may be seen that there has been provided, in accordance with the present invention an improved reserve battery electrochemical cell.

The embodiments of the present invention in which an exclusive property or privilege is claimed are defined as follows:

1. A reserve activated electrochemical cell comprising
   a frangible electrolyte storage means, a first means comprising a cylindrical metal cup-shaped shell, a pair of cell electrodes located within said first means and a second means comprising a cylindrical metal cup-shaped shell forming a contiguous extension of said first means and attached with a weld bead forming a fluid-tight seal joining said shells of said first and second means while providing separate electrical connections to the first and second electrodes wherein an electrical conductive coating on an inside surface of said shell of said first means constitutes a first one of said electrodes and where a second one of said electrodes comprises an electrically conductive ring electrically isolated from said shell of said first means.

2. A cell as set forth in claim 1 wherein said metal shell of said second means is arranged with a closed end having a smaller diameter than a diameter of an open end of said metal shell of said first means to allow said closed end to nest within said open end.

3. A cell as set forth in claim 2 wherein said closed end has a glass seal arranged to allow an electrically conductive wire to pass through said closed end to provide one of the electrical connections while maintaining a fluid-tight state of said closed end.

4. A cell as set forth in claim 1 wherein said storage means comprises a glass ampule.

5. A cell as set forth in claim 1 wherein said shells are each made of stainless steel.

6. A cell as set forth in claim 1 wherein said coating is lithium.

* * * * *